United States Patent
King et al.

(10) Patent No.: US 9,333,829 B2
(45) Date of Patent: May 10, 2016

(54) ADJUSTABLE DAMPING CURVE SHOCK ABSORBER

(71) Applicant: Viking Performance, Inc., Lakeville, MN (US)

(72) Inventors: Christopher J. King, Apple Valley, MN (US); Jacob A. Neuman, Lakeville, MN (US); Todd C. Westberg, Kingston, IL (US)

(73) Assignee: Viking Performance, Inc., Lakeville, MN (US)

( * ) Notice: Subject to any disclaimer, the term of this patent is extended or adjusted under 35 U.S.C. 154(b) by 0 days.

(21) Appl. No.: 14/565,818

(22) Filed: Dec. 10, 2014

(65) Prior Publication Data

US 2015/0158364 A1 Jun. 11, 2015

Related U.S. Application Data

(60) Provisional application No. 61/914,909, filed on Dec. 11, 2013.

(51) Int. Cl.
| | |
|---|---|
| *F16F 9/34* | (2006.01) |
| *B60G 17/08* | (2006.01) |
| *F16F 9/18* | (2006.01) |
| *F16F 9/44* | (2006.01) |
| *B60G 13/06* | (2006.01) |

(52) U.S. Cl.
CPC ............... *B60G 17/08* (2013.01); *B60G 13/06* (2013.01); *F16F 9/185* (2013.01); *F16F 9/44* (2013.01); *B60G 2202/24* (2013.01); *B60G 2204/61* (2013.01); *B60G 2500/10* (2013.01); *F16F 2228/066* (2013.01); *F16F 2230/186* (2013.01)

(58) Field of Classification Search
CPC ............. F16F 9/06; F16F 9/062; F16F 9/092; F16F 9/34; F16F 9/50; B60G 17/04; B60G 11/27; B62K 25/04
USPC ............... 280/5.503, 275, 276, 283; 188/278, 188/314, 282.8, 285
See application file for complete search history.

(56) References Cited

U.S. PATENT DOCUMENTS

| | | | | | |
|---|---|---|---|---|---|
| 4,153,237 | A * | 5/1979 | Supalla | ................... | B60G 17/04 188/266.8 |
| 6,334,517 | B1 * | 1/2002 | De Frenne | ............ | F16F 9/3242 188/285 |
| 2003/0234144 | A1 * | 12/2003 | Fox | ......................... | B62K 25/04 188/278 |
| 2010/0044975 | A1 * | 2/2010 | Yablon | ................... | B60G 11/27 280/5.503 |
| 2015/0323035 | A1 * | 11/2015 | Coaplen | .................. | F16F 9/062 188/269 |

* cited by examiner

*Primary Examiner* — Christopher Schwartz
(74) *Attorney, Agent, or Firm* — Grossman Tucker Perreault & Pfleger, PLLC

(57) ABSTRACT

An adjustment control for adjusting the damping of a shock absorber includes an aperture seat to be secured to a bore of the shock absorber; a needle nut including a needle; an adjustment nut shaft stud including a threaded portion configured to engage with a threaded portion of the needle nut; an adjustment nut to be secured to the base and defining a non-circular cavity to receive at least a portion of the adjustment nut shaft stud and a noncircular region of the needle nut such that the needle nut cannot rotate relative to the non-circular cavity of the adjustment nut; and an adjustment knob, wherein rotation of the adjustment knob causes rotation of the adjustment nut shaft stud relative to the adjustment nut, and wherein rotation of the adjustment nut shaft stud causes axial movement of the needle nut relative to an orifice of the aperture seat.

20 Claims, 10 Drawing Sheets

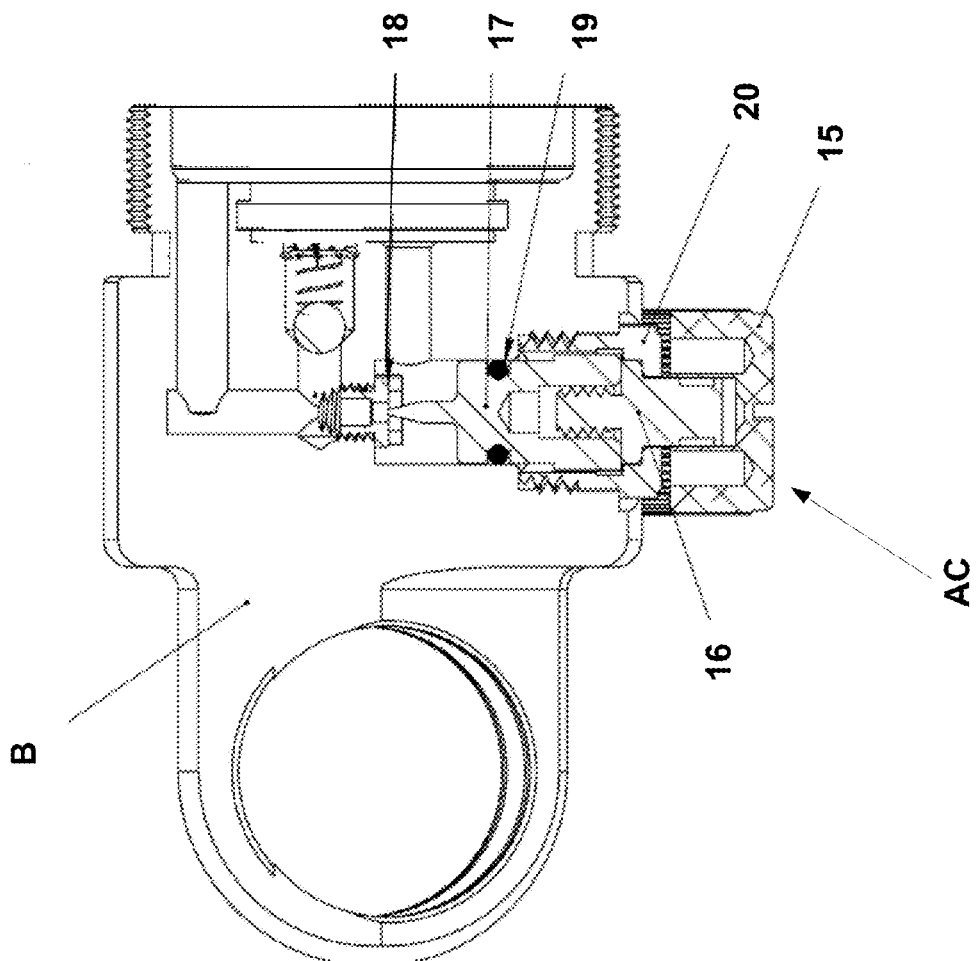
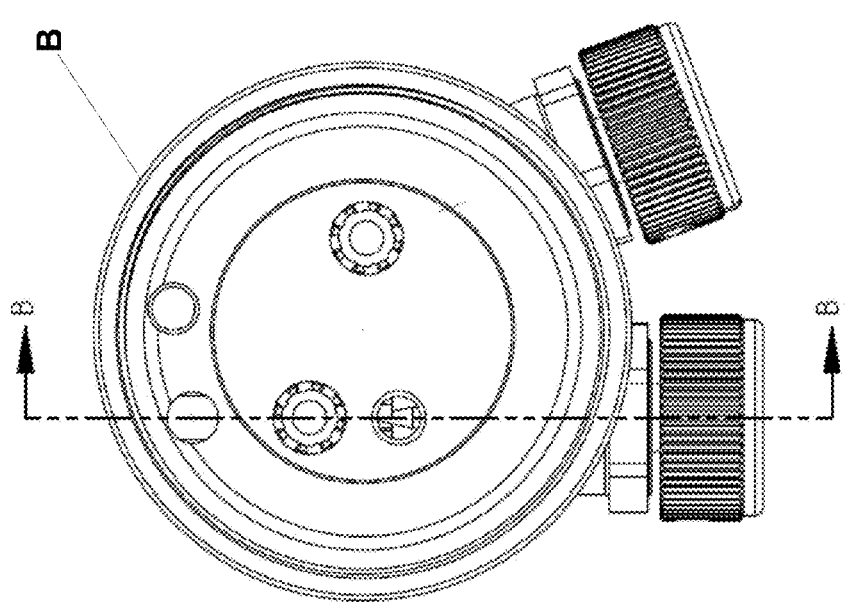
FIG. 4B
FIG. 4A

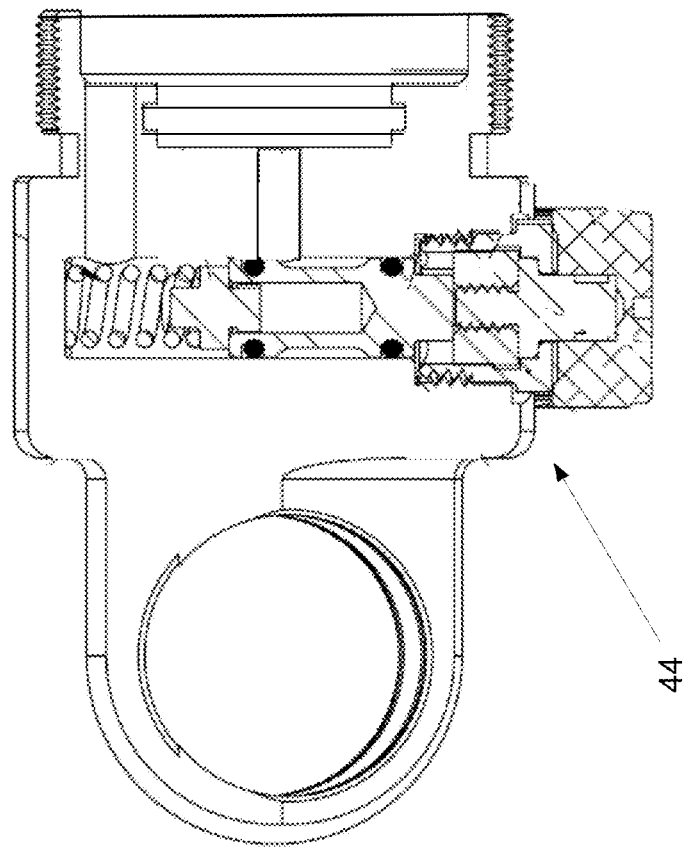
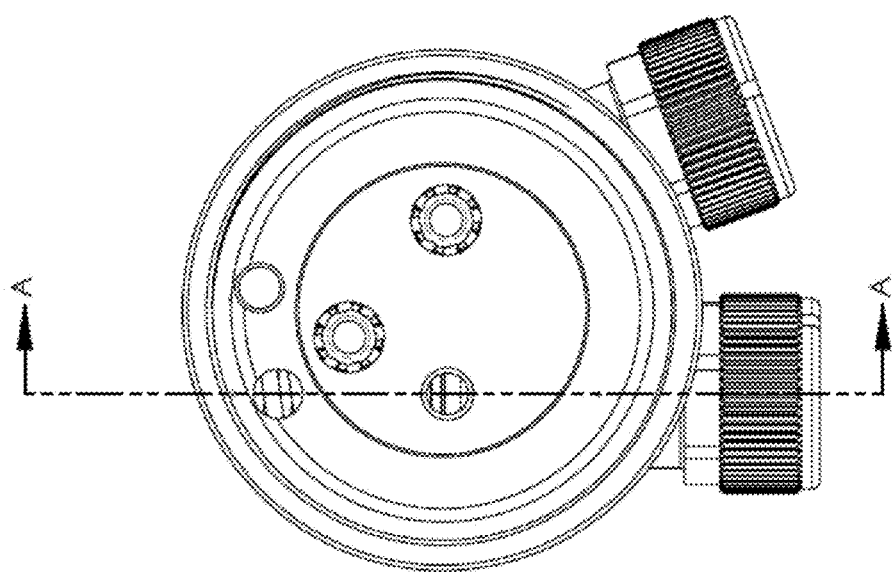
FIG. 6B
FIG. 6A

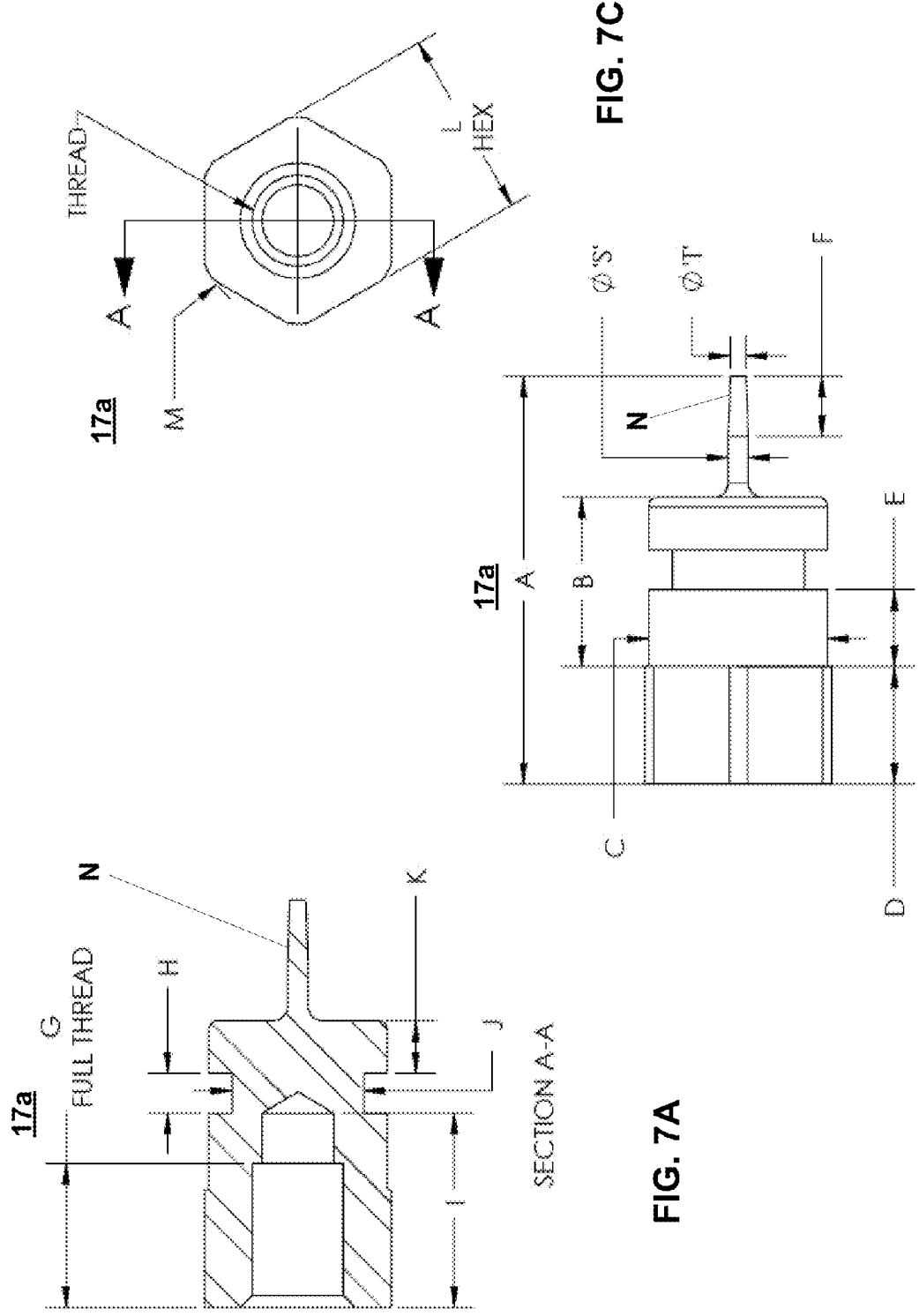

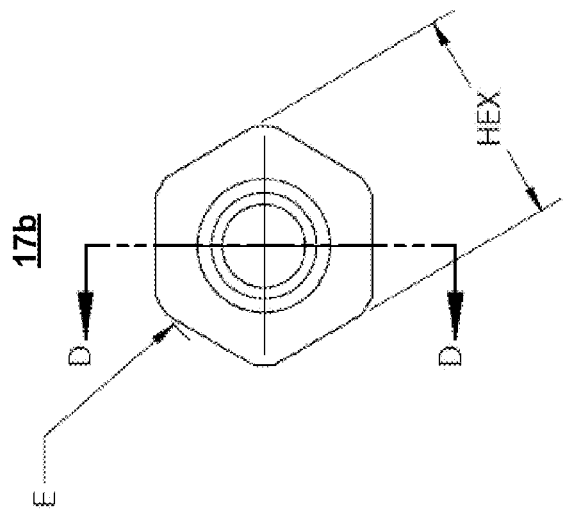
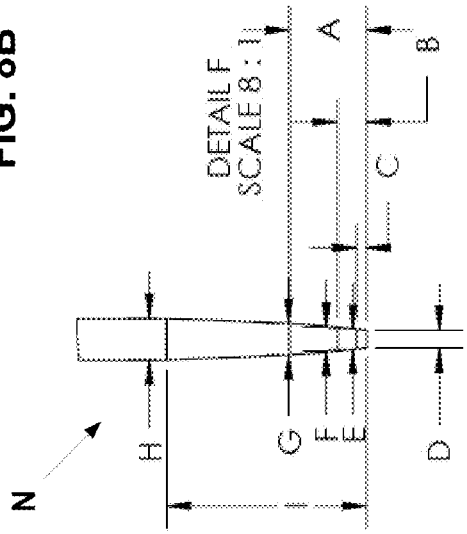
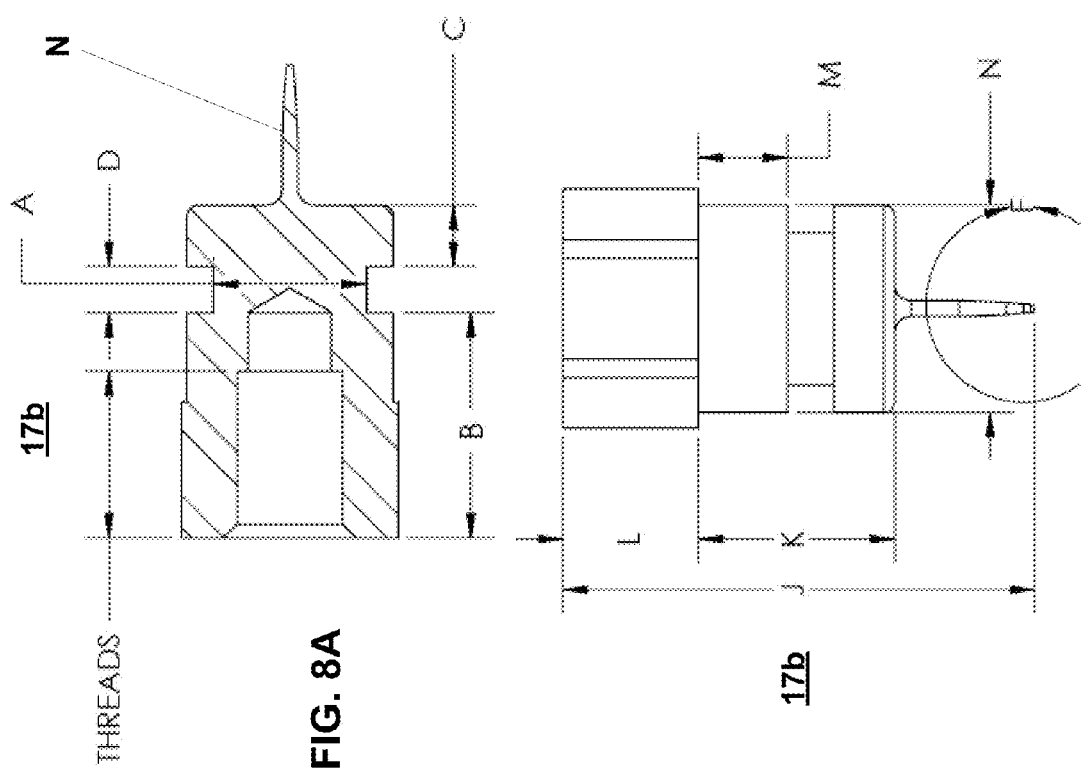

ADJUSTABLE DAMPING CURVE SHOCK ABSORBER

CROSS REFERENCE TO RELATED APPLICATIONS

The present application claims the benefit of U.S. Provisional Application Ser. No. 61/914,909, filed Dec. 11, 2013, the disclosure of which is fully incorporated herein by reference.

FIELD

Embodiments of this invention relate to shock absorbers, and particularly to hydraulic shock absorbers which can have their damping curve adjusted, either in compression, rebound (expansion) or both.

BACKGROUND

Numerous different types of hydraulic shock absorbers are known, such as those disclosed in U.S. Pat. Nos. 4,850,460, 6,276,499, 6,655,512, 7,055,661 and 7,128,192, each incorporated by reference. These various patents and other known shock absorbers teach the importance of the damping curve (force versus speed of shock movement) provided by the shock absorber as it affects the performance of the vehicle. Many shock absorbers require disassembly of the shock absorber to make desired adjustments to the damping performance. Some shock absorbers include external controls which allow adjustment to the damping performance (for example, only to the slope of the damping curve) of the shock absorber. Additionally, the external controls may be provided for the compression damping separately from the rebound (expansion) damping, commonly referred to as "double adjustable" shocks. For instance, Viking Performance, Inc. of Lakeville, Minn. offers a full line of shock absorbers having two rotary control knobs each with 19 different rotational positions (a total of 361 valve combinations). More control over the shape and slope of the damping curve, with minimal disassembly of the shock absorber and maximizing the ease of change, is desired.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4A generally illustrates a generally illustrates a top view of the base assembly of FIG. 2 and FIG. 4B generally illustrates a cross-sectional view taken along lines B-B of FIG. 4A of the compression side of the base assembly consistent with the present disclosure;

FIG. 6A generally illustrates a top view of the base assembly of FIG. 5 and FIG. 6B generally illustrates a cross-sectional view of the compression side of the base assembly taken along lines A-A of FIG. 6A (note, FIG. 3 shows a cross-sectional view of the rebound (expansion) side of the base assembly of FIG. 5);

FIGS. 7A-7C generally illustrate various views of one embodiment of a needle nut with a straight taper consistent with the present disclosures;

FIGS. 8A-8D generally illustrate various views of another embodiment of a preferred needle nut with an engineered taper consistent with the present disclosure.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1A:
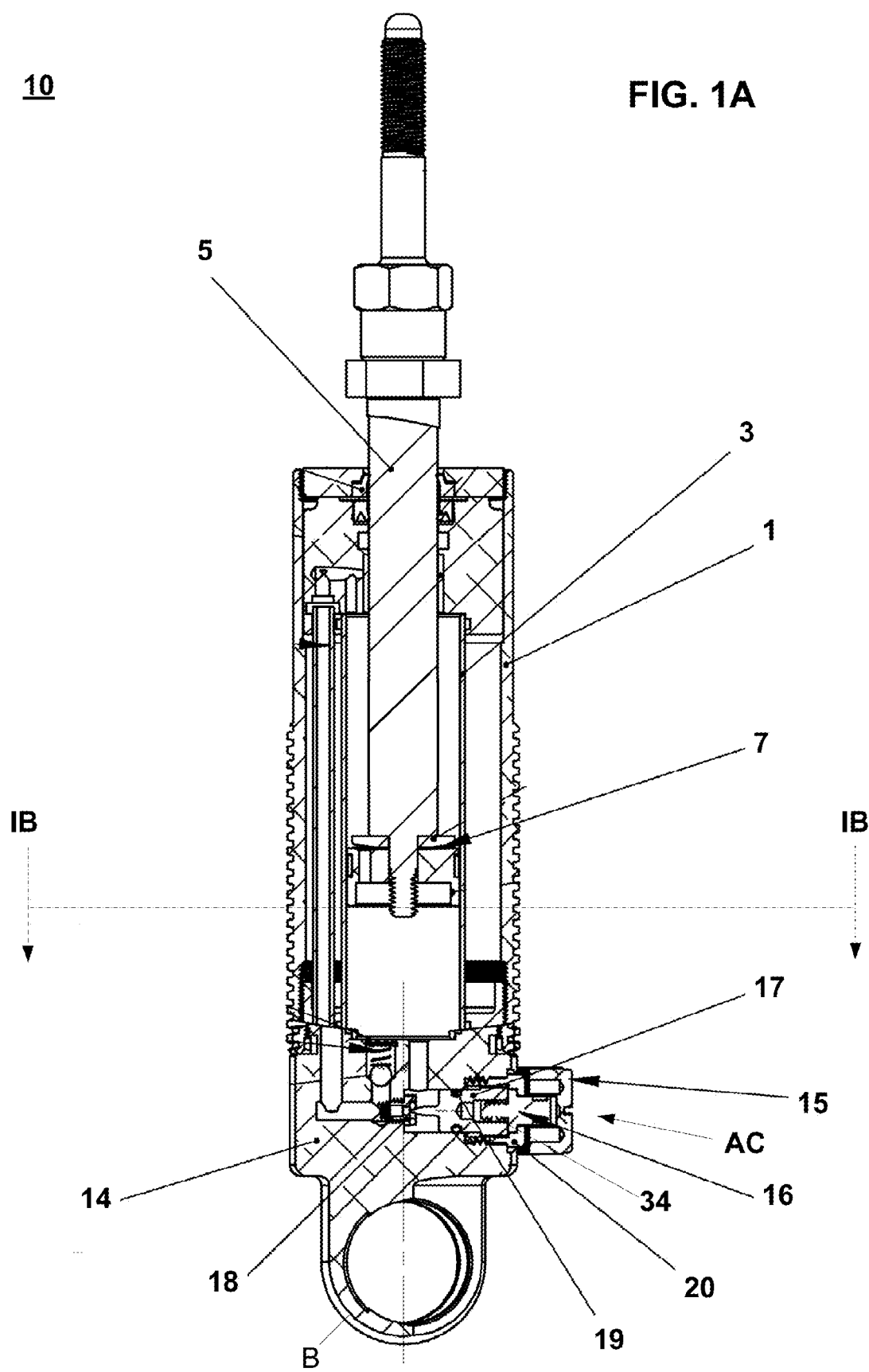
FIG. 1A generally illustrates a cross-sectional view of the full shock absorber.
Figure 1B:
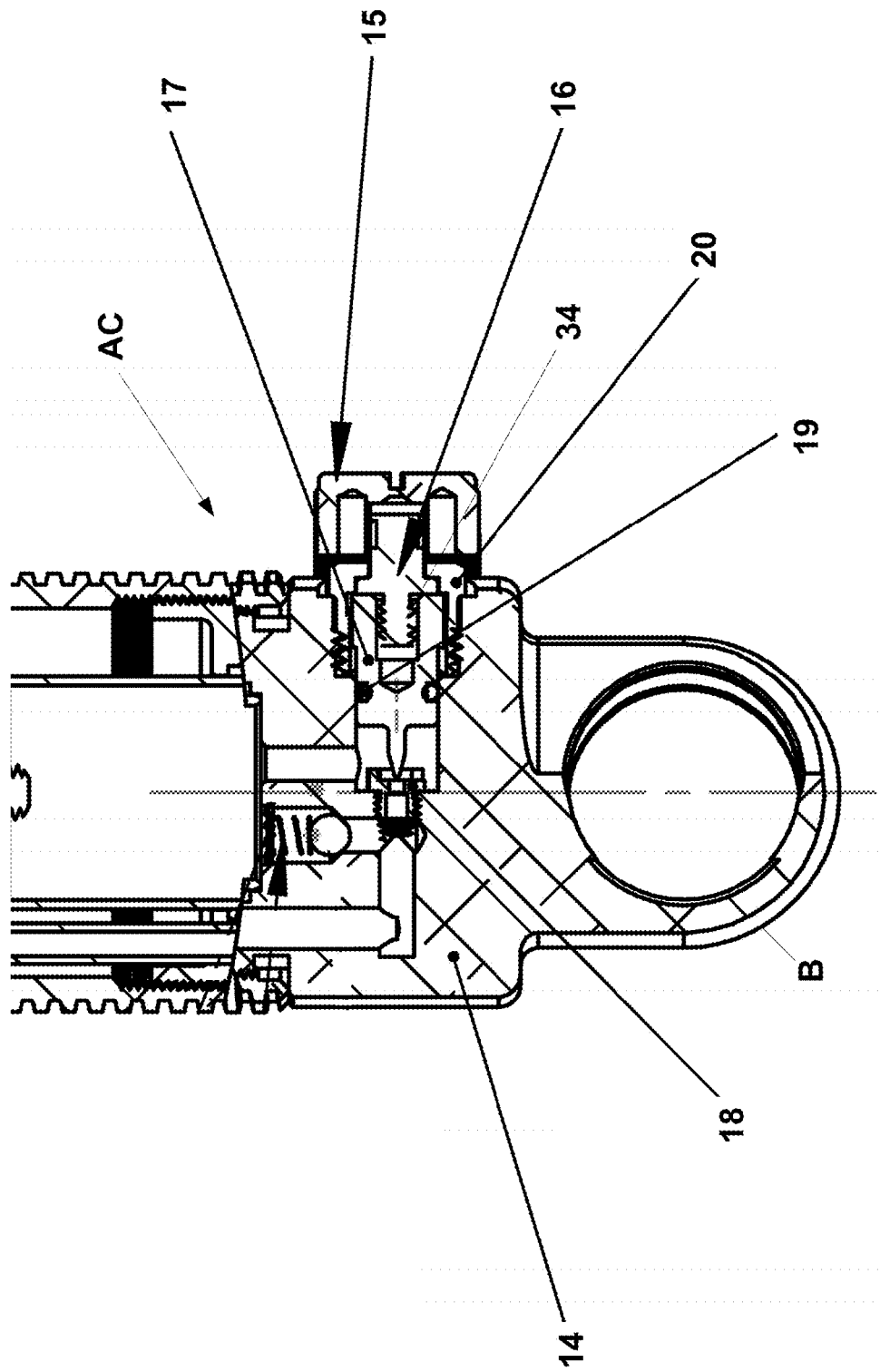
FIG. 1B generally illustrates a cross-sectional view taken along lines IA-IA of FIG. 1.

Turning now to FIG. 1, a cross-sectional view of a shock absorber 10 consistent with one embodiment of the present disclosure is generally illustrated. The shock absorber 10 may include a shock body 1 defining at least one piston cavity 3, a moveable shaft 5 including a shock piston 7 moveably disposed within the piston cavity 3, and a base assembly 14 (e.g., coupled to one end of the shock body 1) including one or more adjustment controls AC. While the base assembly 14 is shown as a separate component from the shock body 1, it should be appreciated that the base assembly 14 may be a unitary component of the shock body 1. As may be appreciated, one or more fluids (such as, but not limited to liquids (e.g., hydraulic fluid or the like) and/or gases (such as, but limited to, nitrogen)) may be disposed within the piston cavity 3. By way of a general overview, and as explained herein, one embodiment of the present disclosure includes adjustment controls AC that are configured to allow a user to easily adjust the damping curve (e.g., the compression and/or rebound (expansion)) of the shock absorber 1 by controlling the flow rates of the fluid in the shock absorber 1 with minimal disassembly of the shock absorber 1 (e.g., while the shaft 5 and the base B of the base assembly 14 is still connected in the vehicle). In one aspect, the aperture seat 18 defining the orifice size is readily replaceable with a standard tool. In another aspect, the shock absorber 1 uses external control(s) 15 with a hand-advancing needle 17 in the aperture seat 18 to control hydraulic oil flow within the shock absorber 1. The needle 17 (e.g., of the needle nut) may have an engineered taper profile.

Figure 2:
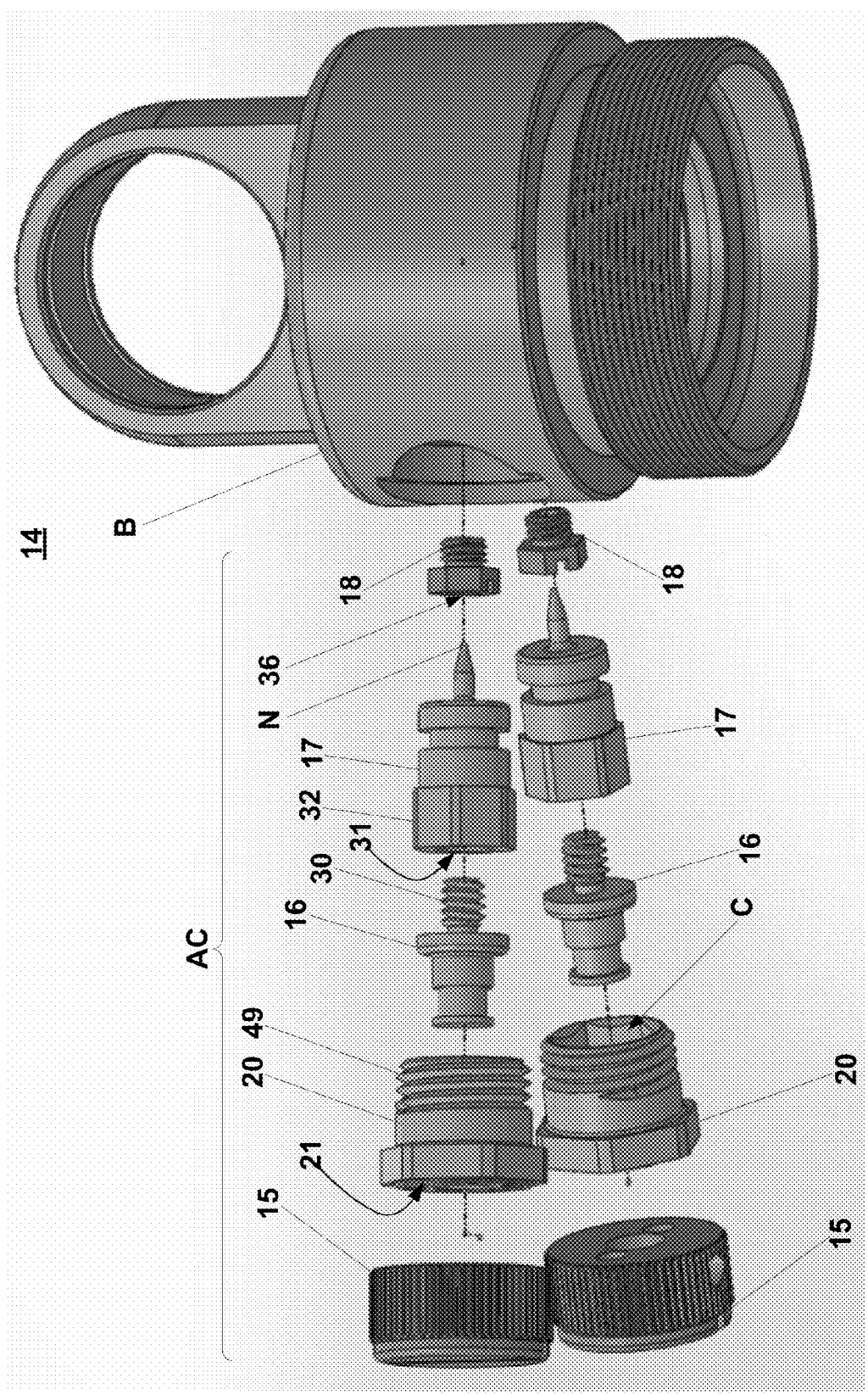
FIG. 2 generally illustrates an exploded view of one embodiment of the shock absorber base consistent with the present disclosure.

With reference to FIG. 2, an exploded view of one embodiment of the base assembly shown 14 of FIG. 1 is generally illustrated. The base assembly 14 includes the base B together with the components that form the adjustment controls AC. It should be appreciated that the adjustment controls AC illustrated in FIG. 2 is an exemplary embodiment, and that the present disclosure should not be limited to the embodiment illustrated unless specifically claimed as such.

Figure 3B:
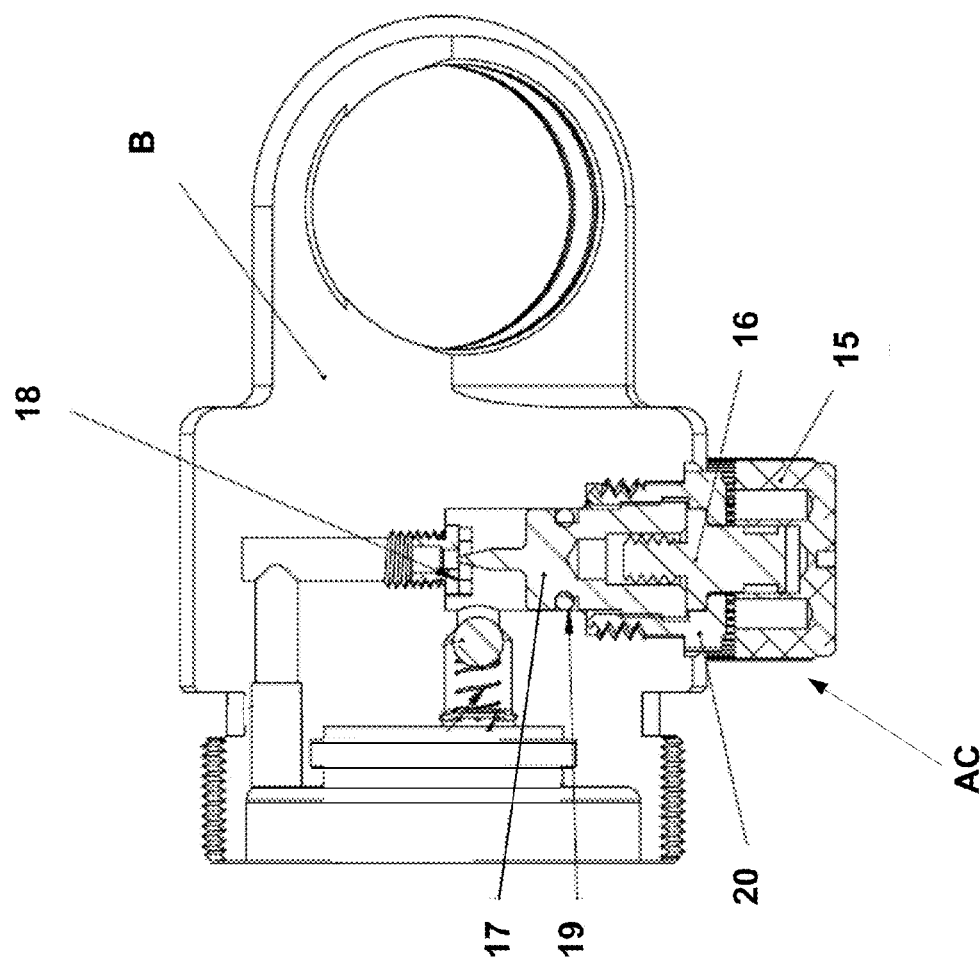
FIG. 3A generally illustrates a top view of the base assembly of FIG. 2 and FIG. 3B generally illustrates a cross-sectional view taken along lines A-A of FIG. 3A of the rebound (expansion) side of the base assembly consistent with the present disclosure.
Figure 3A:
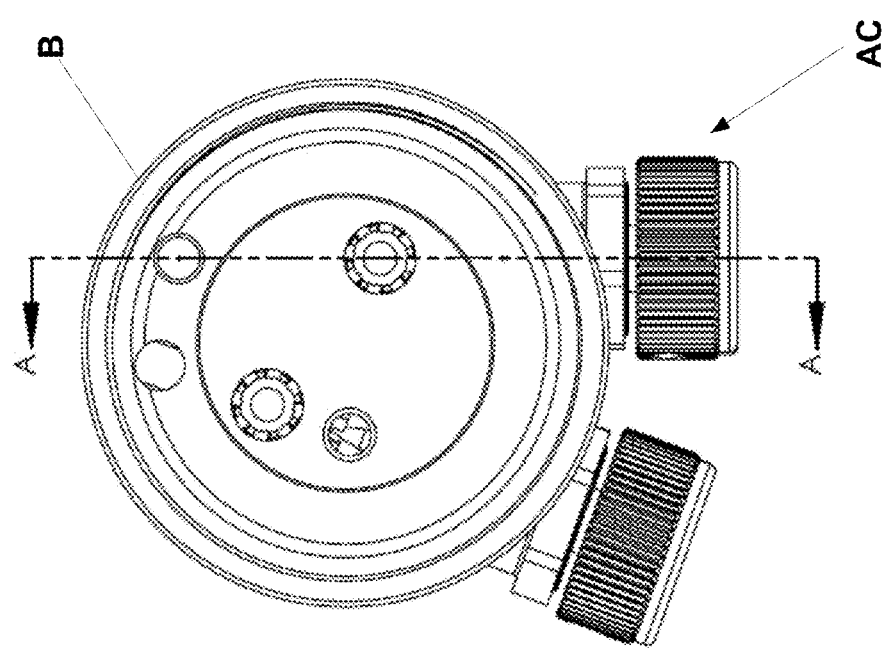
Figure 5:
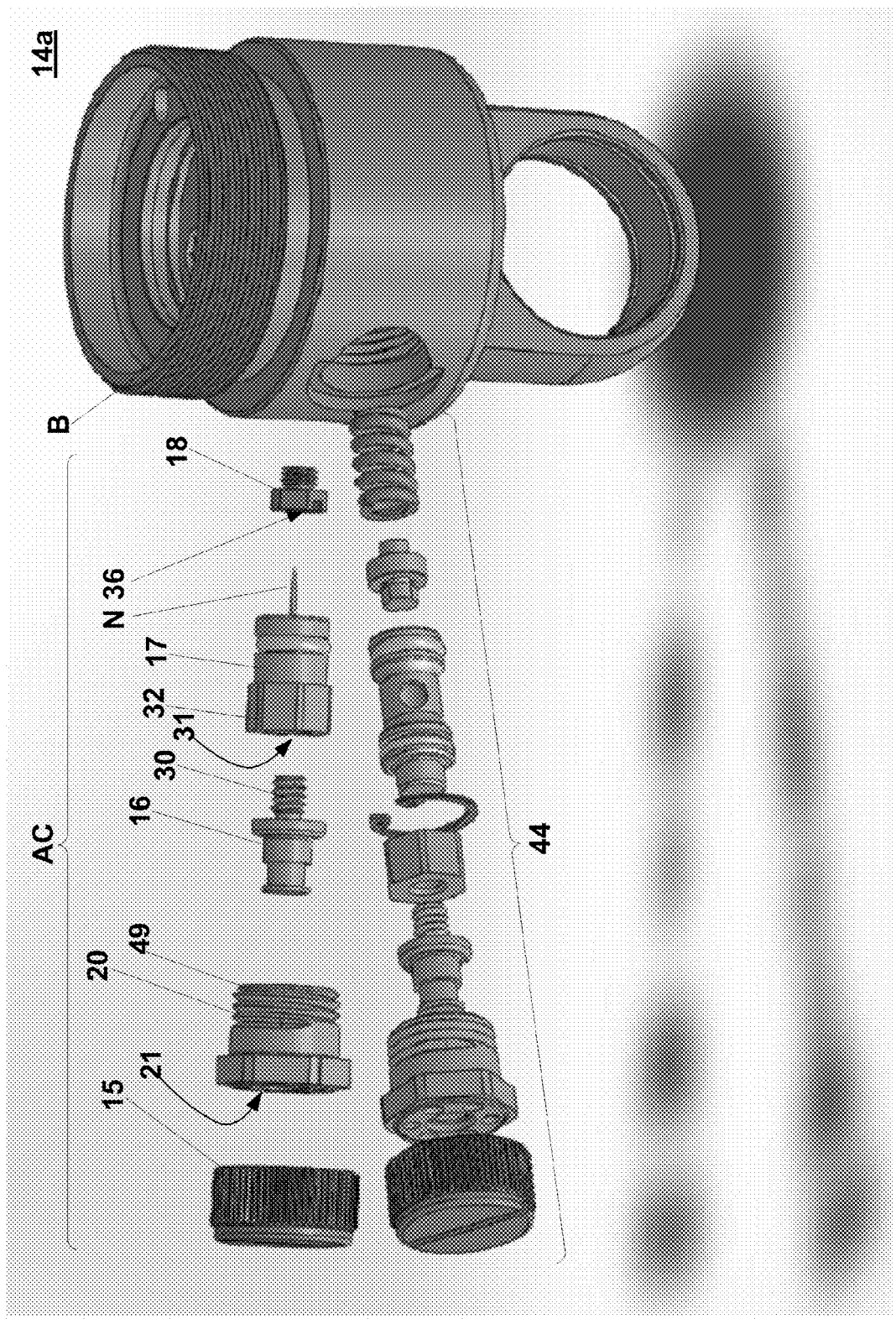
FIG. 5 is an exploded view of an alternative embodiment of a shock absorber base consistent with the present disclosure, wherein the aperture seat and needle nut is used only in one damping direction, which in this case in is the rebound (expansion) side, and prior art adjustability is used on the other damping direction, which in this case is the compression side.

The adjustment controls AC may include an adjuster knob 15, an adjuster nut 20, an adjuster nut shaft stud 16, a needle nut 17, and an aperture seat 18. Additionally, an O-ring 19 (FIGS. 1 and 3B) may be provided on each needle nut 17 so the needle nut 17 seals to the base B. In one set of embodiments generally illustrated in FIGS. 1-4, the shock 1 has the inventive adjustment controls AC both in compression and in rebound (expansion). Alternatively, a shock absorber consistent with the present disclosure may include inventive adjustment controls AC only in rebound (expansion) as generally illustrated in FIGS. 5-6. According to this embodiment, the compression may be fixed or may be controlled using any other mechanism 44 known to those of ordinary skill in the art. One of ordinary skill in the art will understand that the shock absorber could be made with the inventive adjustment controls AC only in compression by changing which bore in the base B of FIGS. 5-6 is detailed/machined. Some shock absorbers which could be combined with one or more embodiments of the adjustment control AC of the present disclosure are described in the materials which have been incorporated by reference. For the sake of brevity, the details of the remainder of the shock absorber will not be described in detail.

The adjustability control AC may feature a needle N which regulates the flow of hydraulic oil between the two chambers under operation of the shock piston 7 (as generally illustrated in FIG. 1). Whether the needle N (FIG. 2) fully seats relative to the orifice 36 in the aperture seat 18 is a design choice. According to at least one embodiment, the needle N is not fully seated or fully "closed" position.

With reference to FIGS. 2 and 5, the adjuster knob 15 can be hand-rotated clockwise or counterclockwise through a sequence of tactile clicks based on its rotary movement. For all or a significant portion of the sequence, rotation of the adjuster knob 15 simultaneously rotates the adjuster nut shaft stud 16, with neither the adjuster knob 15 nor the adjuster nut shaft stud 16 advancing axially when rotating. The adjuster nut shaft stud 16 includes (exterior) threads 30 which mate with (interior) threads 31 of the needle nut 17 (as generally illustrated in FIG. 1), such that rotation of the adjuster knob 15 causes the needle nut 17 to advance axially. The needle nut 17 includes an outer profile with a flat or non-circular portion 32 (e.g., but not limited to, a hexagonal portion), which mates into its bore in the base B (e.g., as generally illustrated in FIG. 1) to prevent the needle nut 17 from rotating as the adjuster knob 15 is turned. According to one embodiment, the threaded connection 34 (as generally illustrated in FIG. 1) between the adjuster nut shaft stud 16 and the needle nut 17 is reverse (left-hand) threaded, so clockwise rotation of the adjuster knob 15 causes the needle nut 17 to advance and counter-clockwise rotation of the adjuster knob 15 causes the needle nut 17 to retract.

Put another way, the adjustment nut shaft stud 16 is coupled to the adjustment knob 15 such that rotation of the adjustment knob 15 causes rotation of the adjustment nut shaft stud 16 within a cavity C formed by the adjustment nut 20. The adjustment knob 15 rotates against a surface 21 of the adjustment nut 20, which prevents the adjustment knob 15 from moving axially. The adjustment nut 20 includes a threaded portion 49 which threadably engages with the base B. The adjustment nut shaft stud 16 is coupled to the adjustment knob 15 such that the adjustment nut shaft stud 16 does not move axially. The adjustment nut shaft stud 16 includes a threaded portion 30 which engages with a corresponding threaded portion 31 of the needle nut 17. The needle nut 17 includes a region 32 having a non-circular configuration which, when received in cavity C of the adjustment nut 20, prevents the needle nut 17 from rotating. Because the needle nut 17 is prevented from rotating within the cavity C of the adjustment nut 20, rotation of the adjustment nut shaft stud 16 (and more specifically rotation of the threaded region 30 of the adjustment nut shaft stud 16) causes threads 31 of the needle nut 17 to axially move the needle nut 17. As a result, the needle N of the needle nut 17 is moved axially relative to the orifice 36 of the aperture nut 18.

The aperture seat 18 is received deeper in the base B (as generally illustrated in FIG. 1). The aperture seat 18 may form a threaded connection with the base B such that the aperture seat 18 is removable from the base B. The aperture seat 18 may therefore be removed from the base B while the base B and the shock shaft 5 remain connected to the vehicle. The aperture seat 18 defines the hydraulic oil flow orifice axially, with the oil flow orifice centered on the longitudinal axis of the needle nut 17. According to the illustrated embodiment, the adjuster knob 15, the adjuster nut shaft stud 16, the needle nut 17, the aperture seat 18, the adjustment nut 20 are disposed on a common axis, though alternative mounting orientations can be designed as long as the advancement of the needle nut 17 properly positions its needle N relative to the orifice 36 in the aperture seat 18.

As will be understood through this description, the separation between the needle N of the needle nut 17 and the aperture 36 in the aperture seat 18 presents a restriction to the flow of oil between shock absorber chambers and therefore significantly affects the damping curve of the shock. The adjustment controls AC according to the present disclosure may control this separation thereby generally resulting in damping response curves that are more progressive than the linear or digressive damping curves created by valves used in other adjustable shocks designs.

According to one embodiment, a fully open position of the needle nut 17 positions the end of the needle N about 0.005 inches outside the aperture 36 in the aperture seat 18. Rotation of the adjuster knob 15 permits advancement through a plurality of indicators (e.g., 21 clicks) for a total advancement of the needle nut 17 of about 0.135 inches (i.e., so the distal 0.13 inches of the needle N projects into the orifice 36 when the needle nut 17 is fully advanced). The orifice 36 may be generally cylindrical and the needle N may have a generally tapered profile. Alternatively, the orifice 36 may have a non-cylindrical shape, including tapered orifices with a cylindrical needle N. The length of the orifice 36 is also a matter of design choice to achieve the desired damping curve. For example, the orifice 36 may have a length which is a little more than ⅓ the length of advancement of the needle nut 17.

Turning now to FIGS. 7A-7C, various views of one embodiment of a needle nut 17a is generally illustrated. For example, the needle N according to FIGS. 7A-7C has a cylindrical section S (see, for example, FIG. 7B) extending from the base and a straight taper F which extends over about 0.125 inches of operative length. A needle nut 17a consistent with this embodiment produces one set of damping response curves for the adjustable shock. With reference to FIGS. 8A-8D, various views of another embodiment of a needle nut 17b consistent with the present disclosure is generally illustrated. For example, the needle N has a cylindrical section H extending from the base and an engineered taper I extending over about 0.135 inches of operative length. The engineered taper I may include a plurality of different tapers (e.g., but not limited to, sections illustrated by A, B, C, D, F, and/or E). The needle N of the needle nut 17b consistent with FIGS. 8A-8D produces a different set of damping response curves for the adjustable shock compared to the needle N of the needle nut 17a of FIGS. 7A-7C. Of course, it should be appreciated that a needle nut 17 consistent with the present disclosure is not limited to the embodiments illustrated in the figures.

As used herein, the term "engineered" refers to a shape of the needle N which is specially shaped (rather than a mere cylinder or conical profile) such as a compound shape which includes a plurality of different tapers and/or shapes, such as cylindrical, conical, frustoconical, etc. For example, an engineered taper may include a non-planar conical and/or fustoconcial shape in which the slope or taper changes along the length of the needle N. The engineered taper of the present disclosure has a different damping response curve compared to a cylindrical or conical profile needle. The selection of the configuration of the engineered taper may therefore depend on the intended application. It has surprisingly been found that the engineered taper profile can be designed to change either the slope or the shape of the series of damping response curves achieved by the shock at the ranges of adjustment possible.

Figure 9B:
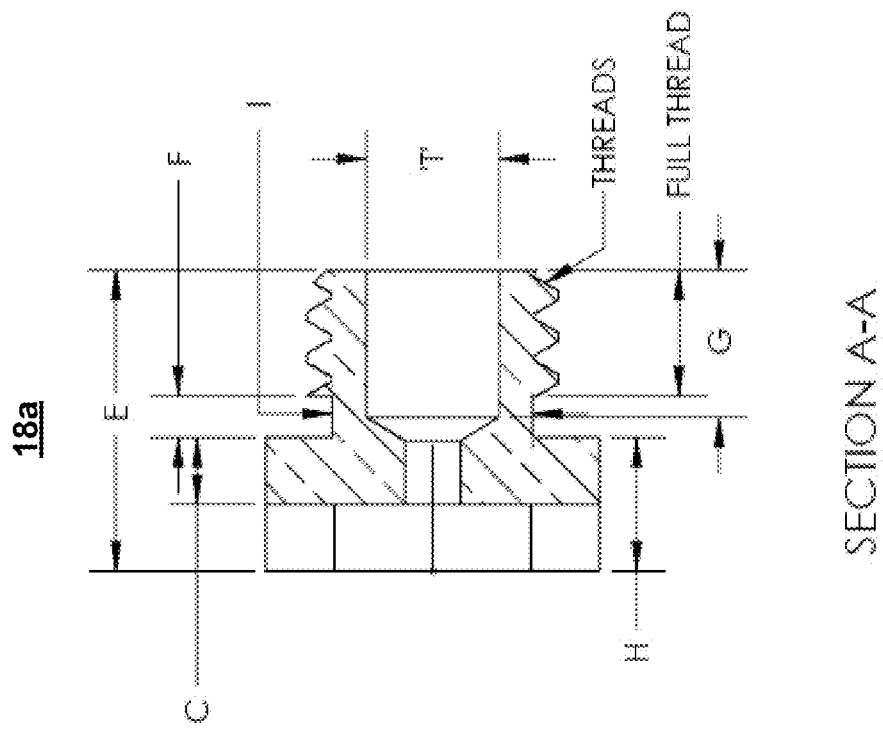
FIGS. 9A-9B generally illustrate various views of one embodiment of an aperture seat consistent with the present disclosure.
Figure 9A:
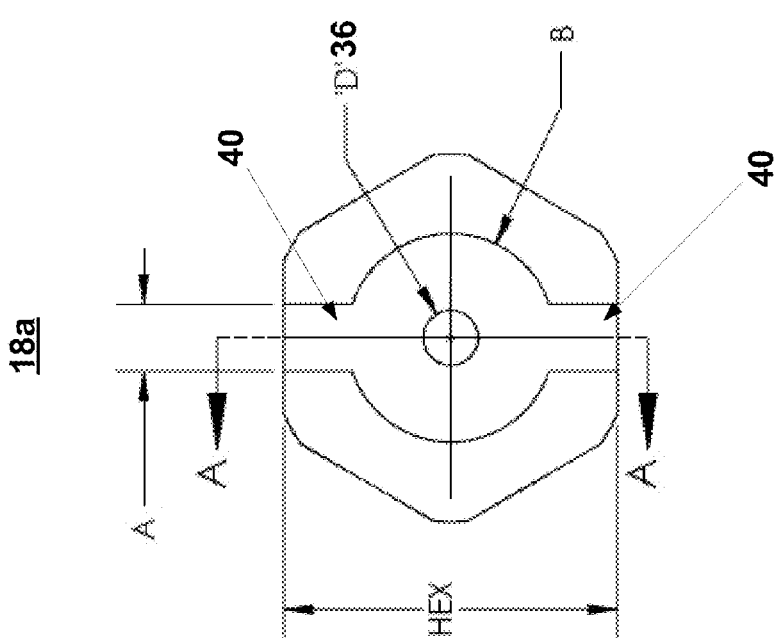

The damping response curve is not only affected by the engineered taper profile and advancement position of the needle N relative to the orifice 36, but is also affected by the size (diameter) of the orifice 36 in the aperture seat 18. Turning now to FIGS. 9A and 9B, another embodiment of the aperture seat 18a is generally illustrated. The aperture seat 18a may be easily changed out (i.e., removed from) of the base B of the base assembly 14 and replaced with another aperture seat 18 having an orifice 36 with a different diameter. For example, the aperture seat 18a may include one or more engagement elements 40 configured to engage with a tool. For example, the engagement elements 40 may include, but are not limited to, one or more notches, groves, holes, or the like configured to engage with a flat head or Philips screw driver, a ratchet, socket, allen/hex key, or the like.

The adjustment controls AC according to at least one embodiment of the present disclosure allows repeatable adjustability of the damping curve created by the shock 1 to a myriad of possibilities. For example, the following features of the adjustment control AC may be adjusted:

22 (hand selectable positions of each needle N on compression)
X
22 (hand selectable positions of each needle N on rebound)
X
11 (selection of any of 11 needle tapers)
X
11 (selection of any of 11 orifice 36 sizes of aperture seats 18)
58,564 potentially different damping curves.

While the exact number of damping curves provided by an adjustment control AC consistent with the present disclosure may vary, it should be appreciated that each of:

a. the (infinitely-adjustable) advancement positions of the needle N;

b. the (infinitely-selectable) diameter/engineered taper of the needle N; and c. the (infinitely-selectable) diameter of the orifice 36 provides an essentially infinite number of different adjustments to the damping curve that can be achieved.

Of course, most drivers and mechanics need not understand or appreciate the exact correlation between shock setting, needle nut selection and aperture seat selection relative to the damping curve achieved. They only need to understand that a particular setting and selection provides the ride characteristics that are desired for the vehicle.

Another beneficial feature of the preferred needle shapes is the cylindrical proximal section of the needle prior to the more distal taper. With this cylindrical proximal section, the oil flow across the active portion of the needle and inside the orifice is generally parallel to the axis of the needle. The 90° turns of oil flow direction within the base occur at locations spaced from the orifice rather than within the orifice. Including the cylindrical proximal section reduces the noise generated by the shock during use.

There are certain vehicles, either due to cost considerations or in racing classes where an adjustable shock is prohibited by rule, wherein the adjustment knobs can be omitted and the shock made adjustable only by changing out the seat(s), and/or by changing out the (fixed position) needle(s). Alternatively, the needle nut can be omitted entirely and the shock made adjustable only by changing out the (typically smaller orifice, due to the omission of the needle) aperture seat(s).

The present disclosure thus provides a simple and low cost arrangement for detailed prescription of an adjustable series of damping curves appropriately selected for the desired suspension and driving conditions of any vehicle. For on-the-fly or during-the-race changes, the driver/pit worker can select any of the 22 positions and change the damping curve provided by the shock. For less time sensitive changes, the mechanic can readily and easily change out either the needle nut and/or the aperture base without taking apart the entire shock. Finally, designers can achieve the exact damping curve profile shape and slope desired through designing different taper profiles.

What is claimed is:

1. An adjustment control for adjusting said damping of a shock absorber, said adjustment control comprising:
    an aperture seat configured to be secured to a bore of said shock absorber, said aperture seat defining an orifice;
    a needle nut including a needle extending outwardly from a first end, a noncircular region disposed about a second end, and a first threaded portion;
    an adjustment nut shaft stud including a second threaded portion configured to engage with said first threaded portion;
    an adjustment nut configured to be secured to said base, said adjustment nut defining a non-circular cavity configured to receive at least a portion of said adjustment nut shaft stud and at least said noncircular region of said needle nut such that said needle nut cannot rotate relative to said non-circular cavity of said adjustment nut; and
    an adjustment knob, wherein rotation of said adjustment knob causes rotation of said adjustment nut shaft stud relative to said adjustment nut, and wherein rotation of said second threaded portion said adjustment nut shaft stud causes axial movement of said needle nut relative to said orifice of said aperture seat.

2. The control of claim 1, wherein said needle include an engineered taper.

3. The adjustment control of claim 2, wherein said engineered taper of said needle includes a plurality of different tapers.

4. The adjustment control of claim 2, wherein said engineered taper of said needle includes a cylindrical portion and a tapered portion.

5. The adjustment control of claim 1, wherein said aperture seat is removably coupled to said bore.

6. The adjustment control of claim 5, wherein said aperture seat includes at least one engagement feature to engage a corresponding engagement feature of a tool to remove said aperture seat from said bore.

7. The adjustment control of claim 5, wherein said at least one engagement feature of said aperture seat includes at least one notch configured to engage a head of a screwdriver.

8. A shock absorber comprising:
a shock body defining at least one piston cavity;
a shaft including a shock piston moveably disposed within said piston cavity;
at least one fluid disposed within said piston cavity;
at least one bore fluidly coupled to a passageway of said shock absorber, and at least one adjustment controls configured to adjust said damping of a shock absorber by regulating said flow rate of said fluid through said passageway, said adjustment control comprising:
  an aperture seat configured to be secured to said bore, said aperture seat defining an orifice;
  a needle nut including a needle extending outwardly from a first end, a noncircular region disposed about a second end, and a first threaded portion;
  an adjustment nut shaft stud including a second threaded portion configured to engage with said first threaded portion;
  an adjustment nut configured to be secured to said base, said adjustment nut defining a non-circular cavity configured to receive at least a portion of said adjustment nut shaft stud and at least said noncircular region of said needle nut such that said needle nut cannot rotate relative to said non-circular cavity of said adjustment nut; and
  an adjustment knob, wherein rotation of said adjustment knob causes rotation of said adjustment nut shaft stud relative to said adjustment nut, and wherein rotation of said second threaded portion said adjustment nut shaft stud causes axial movement of said needle nut relative to said orifice of said aperture seat.

9. The shock absorber of claim 8, further comprising a base assembly configured to be removably secured to said shock body, said base assembly comprising said bore.

10. The shock absorber of claim 8, wherein said needle include an engineered taper.

11. The shock absorber of claim 10, wherein said engineered taper of said needle includes a plurality of different tapers.

12. The shock absorber of claim 10, wherein said engineered taper of said needle includes a cylindrical portion and a tapered portion.

13. The adjustment control of claim 8, wherein said aperture seat is removably coupled to said bore.

14. The adjustment control of claim 13, wherein said aperture seat includes at least one engagement feature to engage a corresponding engagement feature of a tool to remove said aperture seat from said bore.

15. A base assembly for a shock absorber, said base assembly comprising:
a base configured to be secured to a body of said shock absorber, said base defining a bore fluidly coupled to a passageway of said shock absorber; and
an adjustment control for adjusting said damping of said shock absorber, said adjustment control comprising:
  an aperture seat configured to be secured to said bore, said aperture seat defining an orifice;
  a needle nut including a needle extending outwardly from a first end, a noncircular region disposed about a second end, and a first threaded portion;
  an adjustment nut shaft stud including a second threaded portion configured to engage with said first threaded portion;
  an adjustment nut configured to be secured to said base, said adjustment nut defining a non-circular cavity configured to receive at least a portion of said adjustment nut shaft stud and at least said noncircular region of said needle nut such that said needle nut cannot rotate relative to said non-circular cavity of said adjustment nut; and
  an adjustment knob, wherein rotation of said adjustment knob causes rotation of said adjustment nut shaft stud relative to said adjustment nut, and wherein rotation of said second threaded portion said adjustment nut shaft stud causes axial movement of said needle nut relative to said orifice of said aperture seat.

16. The base assembly of claim 15, wherein said needle include an engineered taper.

17. The base assembly of claim 16, wherein said engineered taper of said needle includes a plurality of different tapers.

18. The base assembly of claim 16, wherein said engineered taper of said needle includes a cylindrical portion and a tapered portion.

19. The adjustment control of claim 15, wherein said aperture seat is removably coupled to said bore.

20. The adjustment control of claim 19, wherein said aperture seat includes at least one engagement feature to engage a corresponding engagement feature of a tool to remove said aperture seat from said bore.

* * * * *